(12) United States Patent
Chandrasekar et al.

(10) Patent No.: US 12,254,256 B2
(45) Date of Patent: Mar. 18, 2025

(54) DIAGNOSIS OF INCONSISTENT CONSTRAINTS IN A POWER INTENT FOR AN INTEGRATED CIRCUIT DESIGN

(71) Applicant: Synopsys, Inc., Mountain View, CA (US)

(72) Inventors: Maheshwar Chandrasekar, Santa Clara, CA (US); Brian T. Selden, Hilo, HI (US); Makarand V. Patil, Portland, OR (US)

(73) Assignee: Synopsys, Inc., Sunnyvale, CA (US)

( * ) Notice: Subject to any disclaimer, the term of this patent is extended or adjusted under 35 U.S.C. 154(b) by 490 days.

(21) Appl. No.: 17/864,232

(22) Filed: Jul. 13, 2022

(65) Prior Publication Data

US 2023/0016865 A1    Jan. 19, 2023

Related U.S. Application Data

(60) Provisional application No. 63/222,326, filed on Jul. 15, 2021.

(51) Int. Cl.
| | | |
|---|---|---|
| G06F 30/3323 | (2020.01) | |
| G06F 30/31 | (2020.01) | |
| G06F 30/398 | (2020.01) | |
| G06F 111/04 | (2020.01) | |
| G06F 119/06 | (2020.01) | |

(52) U.S. Cl.
CPC .......... *G06F 30/3323* (2020.01); *G06F 30/31* (2020.01); *G06F 30/398* (2020.01); *G06F 2111/04* (2020.01); *G06F 2119/06* (2020.01)

(58) Field of Classification Search
CPC .................................................. G06F 30/3323
USPC ....................................................... 716/106
See application file for complete search history.

(56) References Cited

U.S. PATENT DOCUMENTS

2013/0305207 A1*  11/2013  Hsieh .................... G06F 30/367
                                                        716/136

* cited by examiner

*Primary Examiner* — Eric D Lee
(74) *Attorney, Agent, or Firm* — Park, Vaughan, Fleming & Dowler LLP; Laxman Sahasrabuddhe

(57) ABSTRACT

A power intent may be loaded on an integrated circuit (IC) design, where the power intent may be represented by a set of constraints. A logic network may be constructed based on the set of constraints and a rule check which is desired to be performed on the power intent. In response to a failure of the rule check, one or more refutation proofs may be created based on the logic network. A subset of the set of constraints may be identified based on the one or more refutation proofs, where the subset of the set of constraints may include an inconsistency which caused the rule check to fail.

20 Claims, 5 Drawing Sheets

DIAGNOSIS OF INCONSISTENT CONSTRAINTS IN A POWER INTENT FOR AN INTEGRATED CIRCUIT DESIGN

RELATED APPLICATION

This application claims the benefit of U.S. Provisional Application Ser. No. 63/222,326, filed on 15 Jul. 2021, the contents of which are herein incorporated by reference in their entirety for all purposes.

TECHNICAL FIELD

The present disclosure relates to integrated circuit (IC) design. More specifically, the present disclosure relates to diagnosis of inconsistent constraints in a power intent for an IC design.

BACKGROUND

Power optimization has become more complex with the advent of low-power IC designs. Complex power optimization implementations may use a complex power network. The term "power network" may refer to circuitry in an IC design that supplies power supply voltages and ground voltages to components in the IC design.

SUMMARY

Embodiments described herein may feature diagnosis of inconsistent constraints in a power intent for an IC design. A power intent may be loaded on an IC design. The power intent may describe power states of the IC design and relationships between the power states and other states or logic signals in the IC design. The power intent may be represented by a set of constraints. The set of constraints may be described using tables and/or logical expressions. A logic network may be constructed based on the set of constraints and a rule check which is desired to be performed on the power intent. The rule check may be performed on the power intent using the logic network. In response to a failure of the rule check, one or more refutation proofs may be created based on the logic network. A subset of the set of constraints may be identified based on the one or more refutation proofs, where the subset of the set of constraints may include an inconsistency which caused the rule check to fail. The IC design may then be modified to remove the inconsistency which caused the rule check to fail.

In some embodiments described herein, the power intent may define a set of power domains. The set of power domains may correspond to a set of power supply voltages. Loading the power intent on the IC design may include electrically connecting the set of power supply voltages to respective power terminals of components in the IC design and creating circuitry to change power states of the set of power domains according to the power intent.

In some embodiments described herein, a signal in the logic network may correspond to a state of a power supply, a signal in the IC design, or a constraint in the set of constraints.

In some embodiments described herein, a graphical user interface (GUI) may be provided, where the GUI may identify a portion of the logic network which corresponds to the inconsistency which caused the rule check to fail.

BRIEF DESCRIPTION OF THE FIGURES

The disclosure can be understood based on the detailed description given below and the accompanying figures. The figures, examples and embodiments are for illustrative purposes, and do not limit the scope of the disclosure. Furthermore, the figures are not necessarily drawn to scale.

DETAILED DESCRIPTION

During IC design, block-level power intent descriptions may be created for different blocks in the IC design. Power intent may be described using a standardized language, which may include, but is not limited to Unified Power Format (UPF). The block-level power intent descriptions may be complex, and interactions between the block-level power intent descriptions at the system level may create additional levels of complexity. Static and dynamic rule checks may be performed on the system-level power intent. Inconsistent constraints may cause rule checks to fail. In some approaches, a user may manually diagnose inconsistent constraints. Such manual approaches for diagnosing inconsistent constraints may be time consuming and error prone.

Some embodiments described herein feature techniques and systems to automatically identify and highlight a minimal part of the power network that is responsible for a rule check failure. Some embodiments described herein may construct a logical statement based on a power network and a set of constraints, and then use refutation proofs obtained from formal-method-based solvers to diagnose a root cause for a rule check failure. Some embodiments described herein may generate a report that identifies the inconsistent constraints. Some embodiments may display and/or highlight a portion of logic in the IC design that caused a rule check failure.

Benefits of embodiments described herein include, but are not limited to, (1) automatically diagnosing inconsistent constraints in a power intent description, and (2) reducing the amount of time and computational resources used for identifying root causes for rule check failures.

Figure 1:
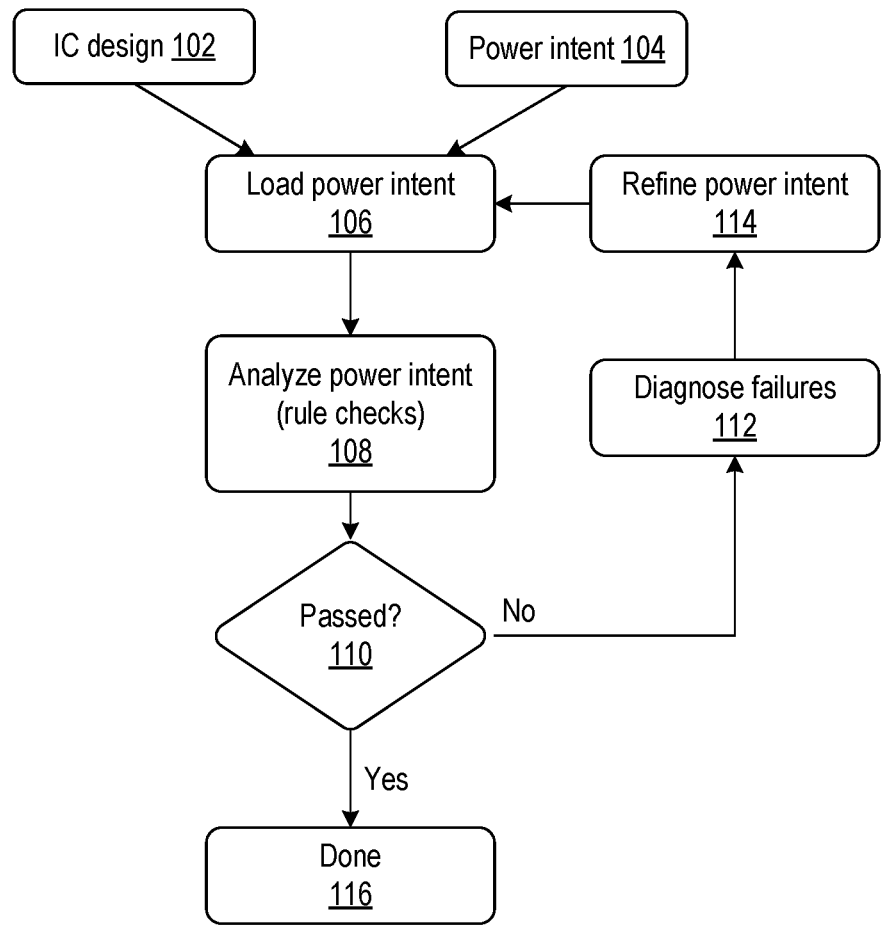
FIG. 1 illustrates a design flow in accordance with some embodiments described herein.

FIG. 1 illustrates a design flow in accordance with some embodiments described herein.

IC design 102 and power intent 104 may be received as inputs. IC design 102 may describe the functionality of the IC, and power intent 104 may describe power optimizations for IC design 102, which may reduce power consumption and meet desired functional specifications. Power intent 104 may be described using UPF and may define operational modes in which IC design 102 may operate.

Specifically, power intent 104 may define one or more power domains for IC design 102 and may define one or more power states for operating IC design 102. A power domain may include one or more components in IC design 102. Each power domain may correspond to a power supply voltage. A power supply voltage corresponding to a power domain may supply power to components that belong to the power domain. A power state for IC design 102 may specify the state and/or voltage levels for one or more power domains. For example, power intent 104 may define two power domains PD1 and PD2 and may specify three power states S1, S2, and S3. Power intent 104 may specify which components in IC design 102 belong to power domain PD1 and which belong to PD2. In power state S1, both power domains PD1 and PD2 may be off. For example, in power state S1, the power supply voltages in PD1 and PD2 may be 0V. In power state S2, power domain PD1 may be on, but power domain PD2 may be off. For example, in power state S2, the power supply voltages of PD1 and PD2 may be 3V and 0V, respectively. In power state S3, both power domains PD1 and PD2 may be on. For example, in power state S3, the power supply voltages of PD1 and PD2 may be 3V and 5V, respectively.

Power intent 104 may be loaded (at 106) on IC design 102. Loading power intent may include (1) electrically connecting power supply voltages to power terminals of components in IC design 102, and (2) creating circuitry that turns on/off power domains based on the power states defined in power intent 104. Specifically, IC design 102 may be described using a first netlist. Loading power intent 104 on IC design 102 may create a second netlist, which may include (1) the circuitry described in the first netlist, (2) electrical connections between components in IC design 102 and power supply voltages, and (3) circuitry that turns on/off power domains based on the power states defined in power intent 104.

Once power intent is loaded (at 106), the power intent may be analyzed (at 108) by performing static and dynamic rule checks on power intent 104. In some embodiments, a logic network may be created based on the power intent and a rule check, and the logic network may be used to perform the rule check. The rule checks may ensure that the power states defined in the power intent are correctly implemented. If all rule checks pass ("Yes" branch emanating from 110), then the design flow may proceed to a next stage (shown as "Done 116" in FIG. 1). On the other hand, if one or more rule checks fail ("No" branch emanating from 110), then the rule check failures may be diagnosed (at 112), and the power intent may be refined (at 114) to rectify the rule check failures. The rectified power intent may then be loaded onto the IC design (at 106).

Different types of rule checks may be performed on the power intent. One type of rule check may determine whether a power supply can ever turn on. For example, this type of rule check will fail if the signals that control the power supply can only cause the power supply to be either in an off-state or a don't-care state but can never cause the power supply to be in an on-state. The state of the supply may be dependent on a combination of the power network driving the supply and the power constraints that apply to that supply. Errors in the power network (e.g., a switch enable that is tied to an off state) may be easier to debug than errors in a set of constraints. For example, it may be difficult to manually analyze and prove that a set of constraints cause a power supply to never turn on.

In some approaches, when power intent analysis (at 108 in FIG. 1) fails, it may identify the rule checks that failed, and the power supplies involved. In some approaches, users may manually try to fix the problems causing the failure. Specifically, a user may attempt to manually identify the minimal power intent logic that causes the rule check failure. Manually identifying such minimal power intent logic is often cumbersome and may use significant man-hours from both a customer and a vendor. Some embodiments described herein may automate failure diagnosis. Specifically, some embodiments described herein may generate a report that identifies a problematic portion (which may be a minimal problematic portion) in the power intent that is causing the power analysis rule checks to fail. Further, some embodiments described herein may display the problematic portion of logic using a GUI to provide a visual aid to a user during the diagnosis process.

Some embodiments described herein diagnose rule check failures by constructing a logical expression based on the set of constraints and identifying a portion of the logical expression that includes a contradiction. Specifically, in some embodiments described herein, an error scenario (which may correspond to the failure of a rule check) may be represented as a logic network. Next, a formal-method-based solver, e.g., a satisfiability (SAT) solver or an Automatic Test Pattern Generation (ATPG) solver, may be used to check if the output of the logic network can be assigned a logic value 1.

The error scenario (i.e., a failure of a rule check) may correspond to the output of the logic network being a constant logic value 0. In other words, the presence of an error scenario (i.e., a failure of a rule check) may correspond to a situation where the output of the logic network cannot be equal to 1 (which may correspond to the logical expression corresponding to the logic network not being satisfiable). In such situations, a formal-method-based solver may be used to generate a refutation proof that represents a reason (which may be a minimal reason) why the objective cannot be satisfied.

A rule check may be represented as a logical expression over a set of variables, where a rule check failure may correspond to the logical expression being unsatisfiable. The set of variables may include a first set of variables that corresponds to objects in IC design 102 (e.g., a variable that corresponds to the logic value of a signal in IC design 102), and a second set of variables that corresponds to objects in power intent 104 (e.g., a variable that corresponds to IC design 102 being in a specific power state).

The logical expression may be represented as a conjunction of a set of clauses. A refutation proof for the logical expression may refer to formal proof which proves that no variable assignment makes all clauses true. A refutation proof may be generated by performing a sequence of resolution steps, where, in each resolution step, a new clause may be derived from two existing clauses. For example, during resolution, the new clause "y" may be derived from the clauses "not x" and "x OR y." The final clause in a refutation proof may be a contradiction (e.g., "x AND not x"), which implies that no variable assignments can make all clauses true.

The term "reason" may refer to a second logical expression that causes a first logical expression to be unsatisfiable. For example, if the first logical expression includes the clauses "not x," "x OR y," and "x," then a reason (i.e., the second logical expression) may be "x AND not x." A refutation proof may include a reason (which may be a minimal reason) for a given logical expression. For example, the reason (i.e., a second logical expression) generated by a refutation proof may indicate a second logical expression (which may be a minimal reason) that is part of the first logical expression and that includes a contradiction.

The logical expression may be constructed so that the constraints that are part of a minimal reason in the refutation proof correspond to a minimal set of conflicting constraints that a user needs to rectify. The portion of the logical expression that corresponds to the minimal reason may represent the root cause for the error scenario. Thus, some embodiments described herein may utilize the minimal reason generated by the refutation proof to (1) generate a report with conflicting constraints that a user may address to resolve the error scenario, and (2) display a subset of logic of the power network that enables the designer to comprehend the root-cause for the error scenario.

Figure 2:
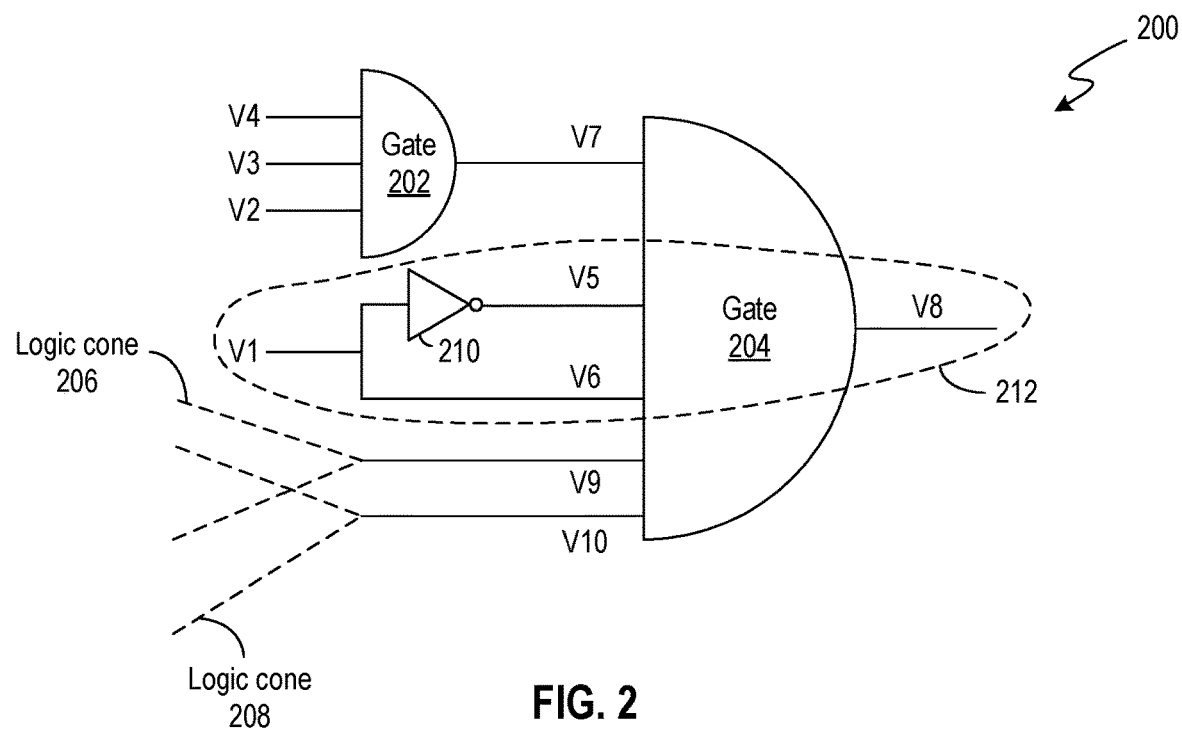
FIG. 2 illustrates a logic network corresponding to an error scenario in accordance with some embodiments described herein.

FIG. 2 illustrates a logic network corresponding to an error scenario in accordance with some embodiments described herein.

Each constraint may define a logical relationship between the power supplies in an IC design. Specifically, a constraint may be represented as a logical expression defined over a set of variables, where the variables may correspond to signals in the IC design, constraints in a rule check, and/or power supplies.

As a specific example, consider a rule check, e.g., R1, that ensures that a given power supply (e.g., PS1) can be turned on. In other words, the rule check fails R1 if power supply PS1 can never turn on. Suppose power supply PS1 is turned on when a set of signals are true. Additionally, suppose a set of constraints defined by the power intent must also be true. The rule check R1 may be performed using a logical expression, which may be represented by logic network 200 (which may also be referred to as a logic circuit) as shown in FIG. 2. Each logic signal in logic network 200 may correspond to the value of a variable or constraint in the logical expression. Each signal may be assigned a label from V1 through V10. For example, gate 202 receives input signals V2, V3, and V4, and generates output signal V7. Likewise, gate 204 receives input signals V5, V6, V7, V9, and V10, and generates output signal V8. Gates 202 and 204 perform "AND" operations.

Suppose there are four constraints in the set of constraints, e.g., CA through CD, that need to be true. Signal V5 may correspond to constraint CA, signal V6 may correspond to constraint CB, signal V9 may correspond to constraint CC, and signal V10 may correspond to constraint CD. A signal corresponding to a constraint may have a logic value that corresponds to the truth value of the constraint. Thus, signal V5 may have a logic value of 0 if the constraint CA is false, and a logic value of 1 if the constraint CA is true.

The value of a constraint may be determined based on one or more signals in the IC design. For example, logic cone 206 of the IC design may determine whether constraint CC (which corresponds to signal V9) is true, and logic cone 208 of the IC design may determine whether constraint CD (which corresponds to signal V9) is true. Likewise, logic cones of the IC design (not shown in FIG. 2) may determine the logic values of signals V1, V2, V3, and V4. One or more logic cones may overlap with each other, i.e., a logic gate in the IC design may belong to multiple logic cones. A "logic cone" associated with a signal may refer to a portion of an IC design that determines the value of the signal. For example, logic cone 206 may be determined by tracing signal V9 backward (i.e., from outputs to inputs) across one or more levels in the IC design.

Signal V5 (which corresponds to constraint CA) and signal V6 (which corresponds to constraint CB) may be inverse of each other as shown by NOT gate 210. Gate 202 may implement the requirement that signals V2, V3, and V4 must have a logic 1 value for the power supply PS1 (which corresponds to signal V7) to be on. Gate 204 may implement the requirement that when power supply PS1 (which corresponds to signal V7) is turned on, the constraints CA, CB, CC, and CC must also be true. Thus, if signal V8 is true then it means that power supply PS1 (which corresponds to signal V7) can be turned on when constraints CA through CD are true. On the other hand, if signal V8 can never be true, then it means that power supply PS1 (which corresponds to signal V7) can never be turned on while at the same time satisfying constraints CA through CD.

In some embodiments described herein, rule check R1 may be checked (e.g., at 108 in FIG. 1). Next, if rule check R1 fails (e.g., "No" branch from 110 in FIG. 1), then a refutation proof for the logic expression represented by logic network 200 may be determined (at 112 in FIG. 1). The refutation proof may generate a reason (which may be a minimal reason) of why the logic expression is not satisfiable and highlight the subcircuit of logic network 200 that corresponds to the reason. For example, in FIG. 2, subcircuit 212 may be highlighted as the reason the logic expression corresponding to logic network 200 is not satisfiable. Subcircuit 212 may be displayed to a user via a graphical user interface (GUI), which may facilitate failure diagnosis (at 112 in FIG. 1).

Figure 3:
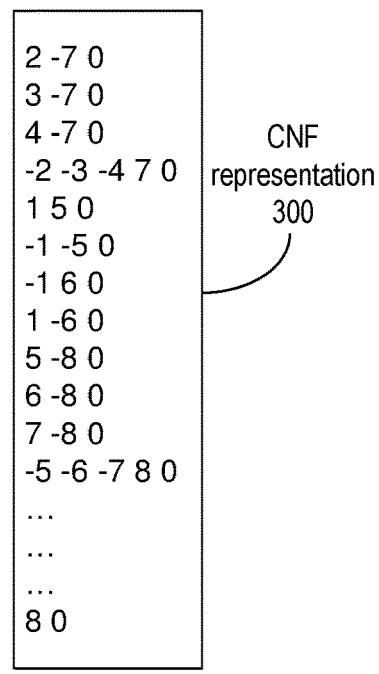
FIG. 3 illustrates a representation of the logic network in FIG. 2 in accordance with some embodiments described herein.

FIG. 3 illustrates a representation of the logic network in FIG. 2 in accordance with some embodiments described herein.

The representation shown in FIG. 3 is in the Center for Discrete Mathematics and Theoretical Computer Science (DIMACS) conjunctive normal form (CNF) format. The CNF format has been used for illustrative purposes and is not intended to limit the scope of the disclosure; in general, any format may be used to represent a logic network. A CNF formula is a conjunction (logical "AND" operation) of a set of clauses. Each clause is a disjunction (logical "OR" operation) of a set of literals, where a literal is a variable or a negation of a variable. In DIMACS CNF, positive integers represent variables and negative integers represent the negation of the variable. Each clause is specified on a separate line and is terminated by a 0.

For example, the first clause in CNF representation 300 is "2 −7 0," which represents the logical "OR" operation between signal V2 and the negation of signal V7. The first four clauses in CNF representation 300 correspond to gate 202, which performs an AND operation on signals V2, V3, and V4. The last clause in CNF representation 300 is "8 0," which represents the signal V8. The conjunction of all the clauses is true only when each clause in CNF representation 300 is true. Thus, the last clause in CNF representation 300 requires that signal V8 must be true, i.e., equal to 1.

Signal V8 in the logic network 200 shown in FIG. 2 cannot be equal to 1 because signals V5 and V6 are complements of each other. Thus, CNF representation 300 may be provided to a SAT solver, which may generate a refutation proof. The refutation proof may be used to identify a reason (which may be a minimal reason) why CNF representation 300 is unsatisfiable. The term "minimal reason" may refer to a minimal set of constraints which contain an inconsistency. Some embodiments described herein may generate multiple refutation proofs, where each refutation proof may correspond to a distinct minimal reason.

Figure 4:
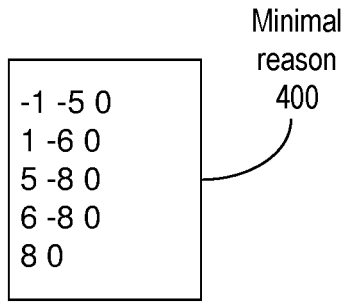
FIG. 4 illustrates a minimal reason why the representation in FIG. 3 is not satisfiable in accordance with some embodiments described herein.

FIG. 4 illustrates a minimal reason why the representation in FIG. 3 is not satisfiable in accordance with some embodiments described herein.

Minimal reason 400 includes signals V1, V5, V6, and V8. Other signals are not included in minimal reason 400. Minimal reason 400 may be used by a user to determine that constraints CA and CB cannot be satisfied together. Accordingly, the user may debug the logic corresponding to constraints CA and CB and ignore other logic and/or constraints. Specifically, in some embodiments described herein, the subcircuit corresponding to minimal reason 400 may be highlighted using a GUI. For example, subcircuit 212 in FIG. 2 (which corresponds to minimal reason 400) may be highlighted.

Figure 5:
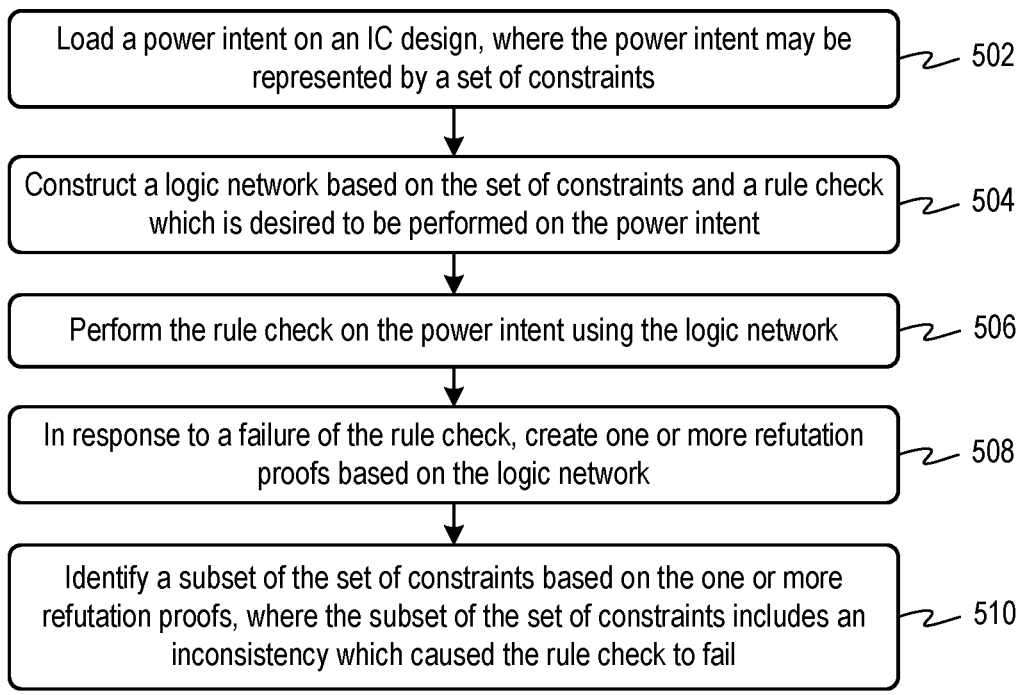
FIG. 5 illustrates a process for automatic diagnosis of inconsistent constraints in accordance with some embodiments described herein.

FIG. 5 illustrates a process for automatic diagnosis of inconsistent constraints in accordance with some embodiments described herein.

A power intent may be loaded on an IC design, where the power intent may be represented by a set of constraints (at 502). The power intent may define a set of power domains, where the set of power domains may correspond to a set of power supply voltages. Loading the power intent on the IC design may include electrically connecting the set of power supply voltages to respective power terminals of components in the IC design and creating circuitry to change power states of the set of power domains according to the power intent. The power intent may describe power states of the IC design and relationships between the power states and other states or logic signals in the IC design. Specifically, the power intent may be represented by a set of constraints, where a constraint may be a logical expression that is defined over a set of variables, and where a variable may correspond to the state of a power supply or a signal in the IC design. A constraint is satisfied if the logical expression evaluates to a true value.

A logic network may be constructed based on the set of constraints and a rule check which is desired to be performed on the power intent (at 504). For example, rule check R1 (as described in reference to FIG. 2) may be desired to be performed on the power intent, where rule check R1 may be associated with constraints CA through CD (as described above).

The rule check may be performed on the power intent using the logic network (at 506). For example, logic network 200 shown in FIG. 2 may be constructed for rule check R1, and logic network 200 may be represented using a standard notation, e.g., CNF representation 300 shown in FIG. 3. In this disclosure, the term "logic network" may refer to a logical expression that may be represented using a network of logic gates. A signal in the logic network may correspond to a state of a power supply, a signal in the IC design, or a constraint in the set of constraints. For example, signals V2, V3, and V4 may correspond to signals in the IC design, signals V5, V6, V9, and V10 may correspond to constraints, and signal V7 may correspond to the state of a power supply. In some embodiments described herein, if the logic network can produce a "1" value (i.e., the logic network is satisfiable), then the rule check may pass. On the other hand, if the logic network cannot produce a "1" value (i.e., the logic network is unsatisfiable), then the rule check may fail.

In response to a failure of the rule check, one or more refutation proofs may be created based on the logic network (at 508). A subset of the set of constraints may be identified based on the one or more refutation proofs, where the subset of the set of constraints includes an inconsistency which caused the rule check to fail (at 510). For example, a formal-method-based solver, e.g., a SAT solver, may be used to generate a refutation proof based on CNF representation 300 in FIG. 3, and the refutation proof may be used to generate minimal reason 400 in FIG. 4. Next, constraints CA and CB may be identified based on minimal reason 400.

In some embodiments described herein, the one or more distinct minimal reasons may be provided to a user, and the user may use these one or more minimal reasons to debug the power intent. For example, the user may debug or diagnose the problem in the power intent that caused constraints CA and CB to be inconsistent with each other. In some embodiments described herein, the one or more minimal reasons may be used to highlight a portion of the logic network that caused the rule checks to fail. For example, subcircuit 212 in FIG. 2 may be highlighted. In some embodiments described herein, the power intent may be modified to remove the inconsistency which caused the rule check to fail. Specifically, a modification to the power intent may be received from a user. Next, the modified power intent may be loaded on the IC design, and the set of rule checks may again be performed.

Figure 6:
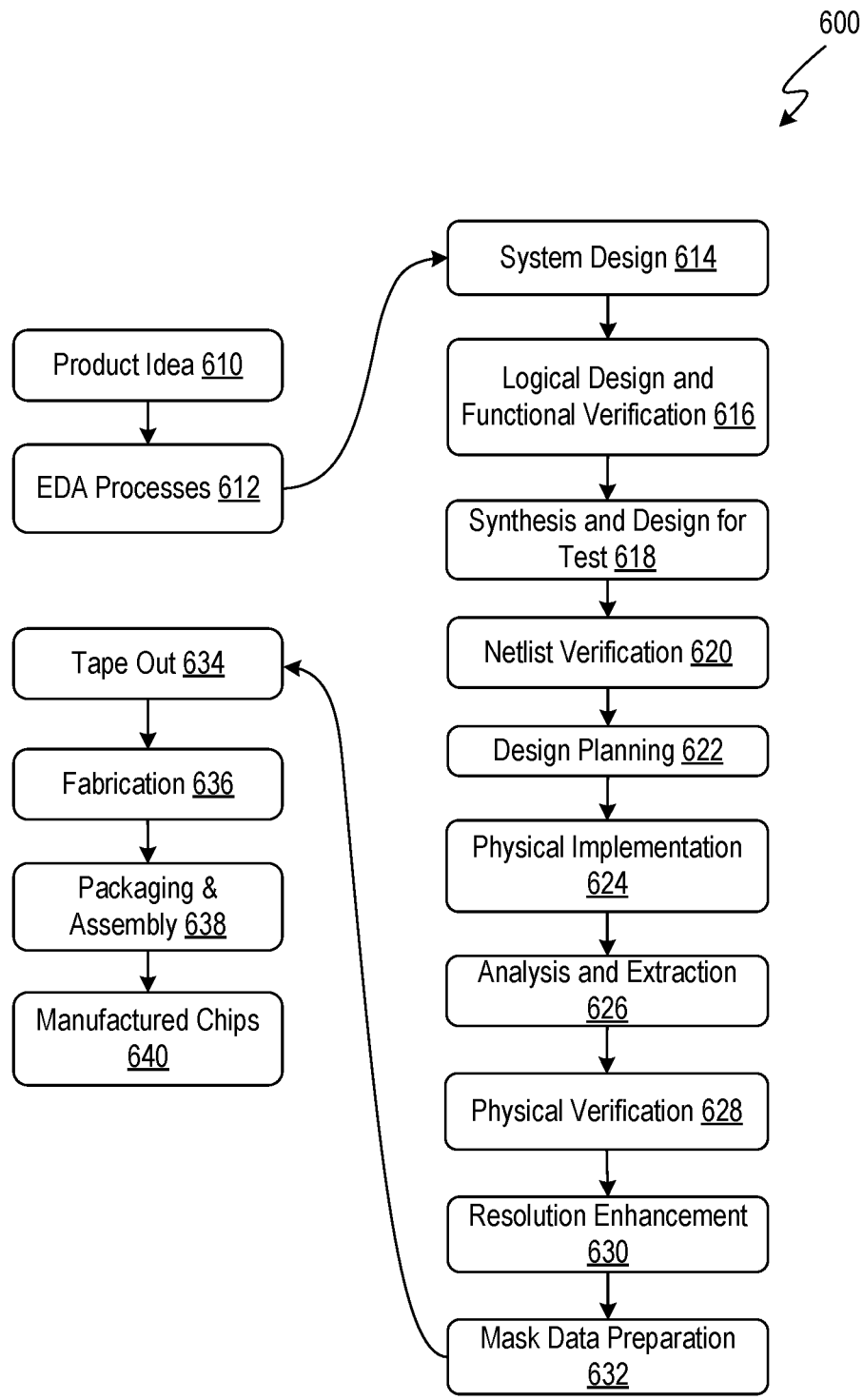
FIG. 6 illustrates an example flow for the design, verification, and fabrication of an integrated circuit in accordance with some embodiments described herein.

FIG. 6 illustrates an example flow for the design, verification, and fabrication of an integrated circuit in accordance with some embodiments described herein.

EDA processes 612 (the acronym "EDA" refers to "Electronic Design Automation") can be used to transform and verify design data and instructions that represent the integrated circuit. Each of these processes can be structured and enabled as multiple modules or operations.

Flow 600 can start with the creation of a product idea 610 with information supplied by a designer, information which is transformed and verified by using EDA processes 612. When the design is finalized, the design is taped-out 634, which is when artwork (e.g., geometric patterns) for the integrated circuit is sent to a fabrication facility to manufacture the mask set, which is then used to manufacture the integrated circuit. After tape-out, a semiconductor die is fabricated 636 and packaging and assembly 638 are performed to produce the manufactured IC chip 640.

Specifications for a circuit or electronic structure may range from low-level transistor material layouts to high-level description languages. A high-level of representation may be used to design circuits and systems, using a hardware description language ("HDL") such as VHDL, Verilog, SystemVerilog, SystemC, MyHDL or OpenVera. The HDL description can be transformed to a logic-level register transfer level ("RTL") description, a gate-level description, a layout-level description, or a mask-level description. Each lower representation level that is a more concrete description adds more detail into the design description. The lower levels of representation that are more concrete descriptions can be generated by a computer, derived from a design library, or created by another design automation process. An example of a specification language at a lower level of representation language for specifying more detailed descriptions is SPICE (which stands for "Simulation Program with Integrated Circuit Emphasis"). Descriptions at each level of representation contain details that are sufficient for use by the corresponding tools of that layer (e.g., a formal verification tool).

During system design 614, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 616, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as test-bench generators, static HDL checkers, and formal verifiers. In some embodiments, special systems of components referred to as 'emulators' or 'prototyping systems' are used to speed up the functional verification.

During synthesis and design for test 618, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 620, the netlist is checked for compliance with timing constraints and for correspondence with the HDL code. During design planning 622, an overall floor plan for the integrated circuit is constructed and analyzed for timing and top-level routing.

During layout or physical implementation 624, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flip-flop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 626, the circuit function is verified at the layout level, which permits refinement of the layout design. During physical verification 628, the layout design is checked to ensure that manufacturing constraints are correct, such as DRC constraints, electrical constraints, lithographic constraints, and that circuitry function matches the HDL design specification. During resolution enhancement 630, the geometry of the layout is transformed to improve how the circuit design is manufactured.

During tape-out, data is created to be used (after lithographic enhancements are applied if appropriate) for production of lithography masks. During mask data preparation 632, the 'tape-out' data is used to produce lithography masks that are used to produce finished integrated circuits.

A storage subsystem of a computer system (such as computer system 700 in FIG. 7) may be used to store the programs and data structures that are used by some or all of the EDA products described herein, and products used for development of cells for the library and for physical and logical design that use the library.

Figure 7:
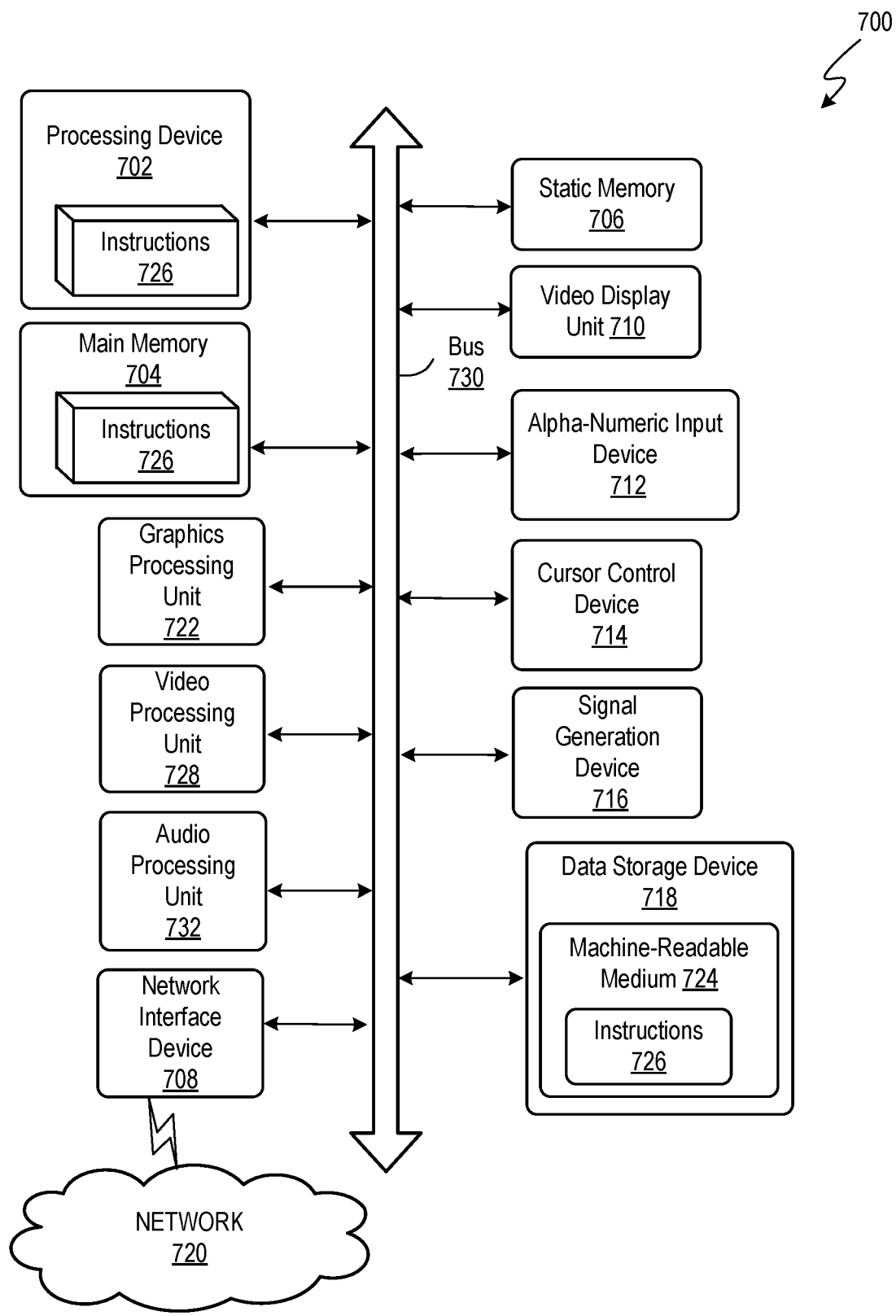
FIG. 7 illustrates an example machine of a computer system within which a set of instructions, for causing the machine to perform any one or more of the methodologies discussed herein, may be executed.

FIG. 7 illustrates an example machine of a computer system 700 within which a set of instructions, for causing the machine to perform any one or more of the methodologies discussed herein, may be executed.

In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various design modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
   loading a power intent on an integrated circuit (IC) design, wherein the power intent is represented by a set of constraints;
   constructing a logic network based on the set of constraints and a rule check which is desired to be performed on the power intent;
   performing the rule check on the power intent using the logic network;
   in response to a failure of the rule check, creating one or more refutation proofs based on the logic network; and
   identifying, by a processor, a subset of the set of constraints based on the one or more refutation proofs, wherein the subset of the set of constraints includes an inconsistency which caused the rule check to fail.

2. The method of claim 1, further comprising modifying the power intent to remove the inconsistency which caused the rule check to fail.

3. The method of claim 1, further comprising providing a graphical user interface (GUI), the GUI identifying a portion of the logic network which corresponds to the inconsistency which caused the rule check to fail.

4. The method of claim 1, wherein a signal in the logic network corresponds to a state of a power supply.

5. The method of claim 1, wherein a signal in the logic network corresponds to a signal in the IC design.

6. The method of claim 1, wherein a signal in the logic network corresponds to a constraint in the set of constraints.

7. The method of claim 1, wherein the power intent defines a set of power domains, wherein the set of power domains correspond to a set of power supply voltages, and wherein the loading the power intent on the IC design comprises electrically connecting the set of power supply voltages to respective power terminals of components in the IC design and creating circuitry to change power states of the set of power domains according to the power intent.

8. A non-transitory computer-readable medium comprising stored instructions, which when executed by a processor, cause the processor to:
   load a power intent on an integrated circuit (IC) design, wherein the power intent is represented by a set of constraints;
   construct a logic network based on the set of constraints and a rule check which is desired to be performed on the power intent;
   perform the rule check on the power intent using the logic network;

in response to a failure of the rule check, create one or more refutation proofs based on the logic network;

identify a subset of the set of constraints based on the one or more refutation proofs, wherein the subset of the set of constraints includes an inconsistency which caused the rule check to fail; and receive a modification to the power intent to remove the inconsistency which caused the rule check to fail.

9. The non-transitory computer-readable medium of claim 8, wherein the instructions, which when executed by the processor, cause the processor to provide a graphical user interface (GUI) which identifies a portion of the logic network corresponding to the inconsistency which caused the rule check to fail.

10. The non-transitory computer-readable medium of claim 8, wherein a signal in the logic network corresponds to a state of a power supply.

11. The non-transitory computer-readable medium of claim 8, wherein a signal in the logic network corresponds to a signal in the IC design.

12. The non-transitory computer-readable medium of claim 8, wherein a signal in the logic network corresponds to a constraint in the set of constraints.

13. The non-transitory computer-readable medium of claim 8, wherein the power intent defines a set of power domains, and wherein the set of power domains correspond to a set of power supply voltages.

14. The non-transitory computer-readable medium of claim 13, wherein loading the power intent on the IC design comprises electrically connecting the set of power supply voltages to respective power terminals of components in the IC design and creating circuitry to change power states of the set of power domains according to the power intent.

15. An apparatus, comprising:
a memory storing instructions; and
a processor, coupled with the memory and to execute the instructions, the instructions when executed causing the processor to:

load a power intent on an integrated circuit (IC) design, wherein the power intent is represented by a set of constraints;

construct a logic network based on the set of constraints and a rule check which is desired to be performed on the power intent;

perform the rule check on the power intent using the logic network;

in response to a failure of the rule check, create one or more refutation proofs based on the logic network;

identify a subset of the set of constraints based on the one or more refutation proofs, wherein the subset of the set of constraints includes an inconsistency which caused the rule check to fail; and provide a graphical user interface (GUI) which identifies a portion of the logic network corresponding to the inconsistency which caused the rule check to fail.

16. The apparatus of claim 15, wherein the instructions, which when executed by the processor, cause the processor to modify the power intent to remove the inconsistency which caused the rule check to fail.

17. The apparatus of claim 15, wherein a signal in the logic network corresponds to a state of a power supply.

18. The apparatus of claim 15, wherein a signal in the logic network corresponds to a signal in the IC design.

19. The apparatus of claim 15, wherein a signal in the logic network corresponds to a constraint in the set of constraints.

20. The apparatus of claim 15, wherein the power intent defines a set of power domains, wherein the set of power domains correspond to a set of power supply voltages, and wherein loading the power intent on the IC design comprises electrically connecting the set of power supply voltages to respective power terminals of components in the IC design and creating circuitry to change power states of the set of power domains according to the power intent.

* * * * *